(12) United States Patent
Chakraborty et al.

(10) Patent No.: US 12,534,671 B2
(45) Date of Patent: Jan. 27, 2026

(54) PLASTIC PYROLYSIS HEATING/REACTION RECIPE

(71) Applicant: LUMMUS TECHNOLOGY LLC, Houston, TX (US)

(72) Inventors: Sudipto Chakraborty, Houston, TX (US); Liang Chen, Houston, TX (US); Te-Chun Chu, Houston, TX (US); Manoj Som, Houston, TX (US); David Lee Guymon, Houston, TX (US); Daniel T. Fernald, Houston, TX (US); Richard John Jibb, Houston, TX (US); Ron Herbanek, Houston, TX (US)

(73) Assignee: Lummus Technology LLC, Houston, TX (US)

( * ) Notice: Subject to any disclaimer, the term of this patent is extended or adjusted under 35 U.S.C. 154(b) by 0 days.

(21) Appl. No.: 18/153,378

(22) Filed: Jan. 12, 2023

(65) Prior Publication Data
US 2023/0227731 A1    Jul. 20, 2023

Related U.S. Application Data

(60) Provisional application No. 63/266,809, filed on Jan. 14, 2022.

(51) Int. Cl.
*C10B 57/02* (2006.01)
*C10B 53/07* (2006.01)
(Continued)

(52) U.S. Cl.
CPC .............. *C10B 57/02* (2013.01); *C10B 53/07* (2013.01); *C10B 57/14* (2013.01); *C10C 3/002* (2013.01); *C10C 3/10* (2013.01); *C10C 3/12* (2013.01)

(58) Field of Classification Search
CPC ......... C10B 53/07; C10B 57/02; C10B 57/14; C10C 3/002; C10C 3/10; C10C 3/12
See application file for complete search history.

(56) References Cited

U.S. PATENT DOCUMENTS

| | | | | |
|---|---|---|---|---|
| 3,984,288 A | * | 10/1976 | Yoshida | C10B 53/07 48/209 |
| 4,463,203 A | * | 7/1984 | Gi | C10G 1/10 201/25 |
| 6,126,907 A | * | 10/2000 | Wada | C10B 7/10 422/184.1 |

(Continued)

FOREIGN PATENT DOCUMENTS

| | | |
|---|---|---|
| CN | 102791832 B | 7/2014 |
| CN | 104245641 A | 12/2014 |

(Continued)

OTHER PUBLICATIONS

International Search Report issued in International Application No. PCT/US2023/010603 dated May 2, 2023 (3 pages).

(Continued)

*Primary Examiner* — Jonathan Miller
(74) *Attorney, Agent, or Firm* — Osha Bergman Watanabe & Burton LLP

(57) ABSTRACT

Systems and processes for pyrolyzing waste plastics, including, in one or more heating stages, heating a waste plastic from an initial temperature to a peak pyrolysis temperature, and, in a final pyrolysis stage, providing heat input sufficient to maintain a temperature of the waste plastic at a pyrolysis reaction temperature less than the peak pyrolysis temperature and maintaining the waste plastic at the pyrolysis reaction temperature for a time period to convert a portion of the waste plastic to a pyrolyzed product and a pitch. The process further includes recovering the pyrolyzed product and recovering the pitch.

15 Claims, 2 Drawing Sheets

(51) Int. Cl.
*C10B 57/14* (2006.01)
*C10C 3/00* (2006.01)
*C10C 3/10* (2006.01)
*C10C 3/12* (2006.01)

(56) References Cited

U.S. PATENT DOCUMENTS

| | | | |
|---|---|---|---|
| 7,883,605 B2 | 2/2011 | Grispin | |
| 8,282,787 B2* | 10/2012 | Tucker | C10B 53/00 |
| | | | 95/114 |
| 9,499,457 B2* | 11/2016 | Hershkowitz | B01J 8/0496 |
| 10,184,081 B2* | 1/2019 | Dülger | C10B 53/07 |
| 10,421,911 B2* | 9/2019 | Ullom | C10B 47/30 |
| 10,731,081 B2* | 8/2020 | Ullom | C10B 53/07 |
| 10,899,042 B2* | 1/2021 | Gehr | B09C 1/065 |
| 11,795,401 B2* | 10/2023 | Chakraborty | C10B 53/07 |
| 2006/0280669 A1* | 12/2006 | Jones | C10B 53/02 |
| | | | 202/136 |
| 2011/0034712 A1* | 2/2011 | Lin | C11B 1/10 |
| | | | 202/105 |
| 2013/0211169 A1 | 8/2013 | Hershkowitz et al. | |
| 2013/0256113 A1* | 10/2013 | Tumiatti | C10B 49/14 |
| | | | 422/187 |
| 2016/0017232 A1* | 1/2016 | Ullom | C10G 1/02 |
| | | | 202/117 |
| 2016/0024390 A1* | 1/2016 | Ullom | C10G 1/086 |
| | | | 202/99 |
| 2022/0228070 A1* | 7/2022 | Chakraborty | C10B 31/06 |

FOREIGN PATENT DOCUMENTS

| | | |
|---|---|---|
| CN | 106883870 A | 6/2017 |
| WO | 2018044552 A1 | 3/2018 |
| WO | 2021183949 A1 | 9/2021 |

OTHER PUBLICATIONS

Written Opinion issued in International Application No. PCT/US2023/010603 dated May 2, 2023 (4 pages).
Office Action issued in Taiwanese Application No. 112101608 mailed on Feb. 1, 2024 (8 pages).

* cited by examiner

PLASTIC PYROLYSIS HEATING/REACTION RECIPE

FIELD OF THE DISCLOSURE

Embodiments of the present disclosure generally relate to pyrolysis of waste plastic materials. More specifically, embodiments herein relate to a recipe to progressively phase waste plastic feed materials through a sequence of reaction steps to achieve a desired product mixture and overall conversion.

BACKGROUND

Pyrolysis of plastics is often performed in a batch process, where the batch is brought up to a single set point temperature, or provided with a constant heat input rate, until reaction of the batch is complete. Other processes step the feed through a series of heating zones, also with defined set temperatures and residence times per zone.

For example, U.S. Pat. No. 7,883,605 describes a process for pyrolyzing hydrocarbonaceous material whereby the heat rate is defined based on the reactor charge in a range 0.25 to 27 kW/kg.

U.S. Ser. No. 10/421,911 (Alterra) describes an extruder section (with at least three zones) and a multi zone kiln reactor (with at least two zones) including a zone for (further) destabilization and dehalogenating and a zone for pyrolyzing and devolatilizing pyrolyzed hydrocarbonaceous materials. The kiln and the extruder are in fluid communication. Each zone has a temperature and residence time, as follows:

- 3 zones (Extruder 1-3); 4 zones (ribbon mixer+screw conveyor 4-7).
- Zone 1—Feed/Extruder/heating by viscous dissipation (input of electrical energy).
- Zone 2—Compression—Extruder—expel air and steam; 3 mins at 220° F. and 0.1 atm.
- Zone 3—Melting—Extruder at 220-572° F. for 15-45 minutes.
- Zone 4—Mixing and dehalogenation, 572-690° F. for 30-120 minutes; optional removal of paraffin wax (30-70 carbon number), Ribbon mixer with open segments, optionally with no helical screw, only ribbon mixer. Of the total condensable product, 2-22% may be from Zone 4.
- Zone 5—Pyrolysis 690-740° F. (lower) and 850-910° F. (upper) for 30-90 minutes.
- Zone 6—Devolatilization 1100-1200° F. (593-649° C.) for 15-60 minutes at <5 psig (preferred 0.8 psig).
- Zone 7—Char up to 1800° F. for 15-30 minutes.

Such processes with constant heat input or increasing temperatures may produce a lot of char or coke, and may result in a large quantity of undesirable products.

SUMMARY OF THE CLAIMED EMBODIMENTS

Embodiments herein may allow for a high liquid yield to be realized at higher capacities. Further, instead of producing coke or char, in addition to desirable liquid products embodiments herein may produce a pitch product instead of allowing char to form.

In one aspect, embodiments disclosed herein relate to a process for pyrolyzing waste plastics. The process includes, in one or more heating stages, heating a waste plastic from an initial temperature to a peak pyrolysis temperature, and, in a final pyrolysis stage, providing heat input sufficient to maintain a temperature of the waste plastic at a pyrolysis reaction temperature less than the peak pyrolysis temperature and maintaining the waste plastic at the pyrolysis reaction temperature for a time period to convert a portion of the waste plastic to a pyrolyzed product and a pitch. The process further includes recovering the pyrolyzed product and recovering the pitch.

In another aspect, embodiments disclosed herein relate to a process for pyrolyzing waste plastics. The process includes heating a waste plastic from an initial temperature to a first temperature and maintaining the waste plastic at the first temperature for a first time period, producing a first heated plastic. The process also includes heating the first heated plastic to a second temperature and maintaining the first heated plastic at the second temperature for a second time period, producing a second heated plastic. Following heating to form the second heated plastic, the process includes heating the second heated plastic to a third temperature and maintaining the second heated plastic at the third temperature for a third time period, producing a third heated plastic, as well as heating the third heated plastic to a fourth, peak, temperature, producing a fourth heated plastic. Heat input is provided to maintain a temperature of the fourth heated plastic at a fifth temperature and maintaining the fourth heated plastic at the fifth temperature for a fourth time period. The first temperature is less than the second temperature, the second temperature is less than the third temperature, the third temperature is less than the fourth temperature, and the fifth temperature is less than the fourth temperature.

In another aspect, embodiments disclosed herein relate to a process for pyrolyzing waste plastic. The process may include heating and melting a waste plastic material in a melt tank to produce a molten plastic. The process further includes transporting the molten plastic from the melt tank to a pyrolysis reactor, and, in the pyrolysis reactor, heating the molten plastic to a peak temperature and subsequently maintaining a temperature of the molten plastic at a reaction temperature less than the peak temperature for a period of time. The pyrolysis oil product and pitch are each recovered from the reactor.

In yet another aspect, embodiments disclosed herein relate to a system for pyrolyzing waste plastics. The system includes each of a first heating zone, a second heating zone, a third heating zone, a fourth heating zone, and a fifth heating zone. The first heating zone is configured for heating a waste plastic from an initial temperature to a first temperature and maintaining the waste plastic at the first temperature for a first time period, producing a first heated plastic. The second heating zone is configured for heating the first heated plastic to a second temperature and maintaining the first heated plastic at the second temperature for a second time period, producing a second heated plastic. The third heating zone is configured for heating the second heated plastic to a third temperature and maintaining the second heated plastic at the third temperature for a third time period, producing a third heated plastic. The fourth heating zone is configured for heating the third heated plastic to a fourth, peak, temperature, producing a fourth heated plastic. The fifth heating zone is configured for providing heat input sufficient to maintain a temperature of the fourth heated plastic at a fifth temperature, less than the fourth temperature, and maintaining the fourth heated plastic at the fifth temperature for a fourth time period.

Other aspects and advantages will be apparent from the following description and the appended claims.

DETAILED DESCRIPTION

Figure 1:
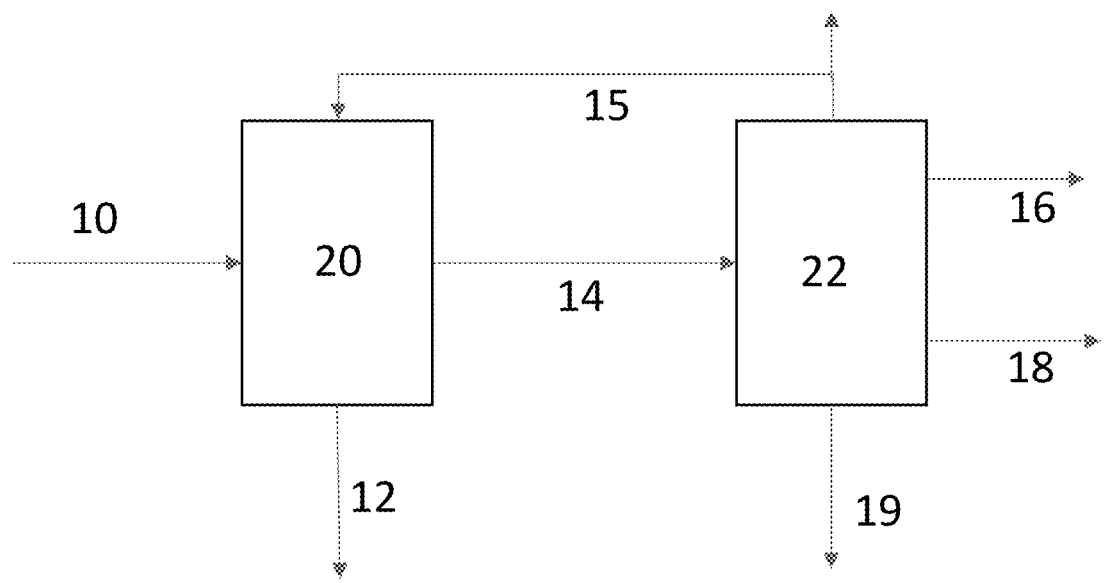
FIG. 1 illustrates a system for pyrolyzing waste plastics according to one or more embodiments disclosed herein.

Embodiments herein are directed toward thermochemical processes to convert waste plastics to useful petrochemicals and other intermediates or end products. More specifically, embodiments herein are directed toward processes and systems configured to preferentially convert waste plastics to useful petrochemicals while limiting, minimizing, or nullifying coke formation during the waste plastic conversion process.

Waste materials, such as plastics, elastomers, and other polymeric materials, for example, may undergo pyrolysis according to embodiments herein to break down the polymeric materials and to form a pyrolysis oil. Such a waste-derived pyrolysis oil may then be processed in downstream reactors, such as by catalytic or thermal cracking, to form olefins and petrochemical intermediates. Such olefins and petrochemical intermediates may then be used to again form polymeric materials, including thermoplastics and elastomeric polymers, providing, in some embodiments, truly circular polymers.

Waste-derived hydrocarbon streams may be derived according to embodiments herein by pyrolyzing a waste stream comprising polymeric materials, such as thermoplastics, tires, or other polymeric materials, producing a waste plastic pyrolysis oil. Polymers that may by pyrolyzed to form a waste plastic pyrolysis oil may include thermoplastics, thermosets, and elastomers. For example, waste material undergoing pyrolysis to form a waste plastic pyrolysis oil may include polystyrene, polypropylene, polyphenylene sulfide, polyphenylene oxide, polyethylene, polyetherimide, polyether ether ketone, polyoxymethylene, polyether sulfone, polycarbonate, polybenzimidazole, polylactic acid, nylon, and acrylic polymers such as poly methyl methacrylic acid (PMMA), among many other thermoplastics. Waste plastic pyrolysis oils useful herein may also be formed from various unsaturated or saturated elastomers and rubbers known in the art, such as polybutadiene, isoprene, styrene-butadiene, ethylene vinyl acetate, and many, many others. Embodiments herein may be robust enough to process some quantity of heteroatom-containing polymers, including those listed above as well as others known in the art; however, a heteroatom content of the resulting waste plastic pyrolysis oil should typically be less than 2 wt %, such as less than 1 wt % or less than 0.5 wt %.

Thermal pyrolysis of a plastic feedstock according to embodiments herein may be conducted by heating a plastic feedstock to an elevated temperature, such as a temperature in the range from 300° C. to 850° C., such as from about 350° C. to about 600° C. Pyrolysis of the plastics may produce various hydrocarbons, including light gas hydrocarbon products and liquid hydrocarbon products.

The thermal mechanism of the process is essentially non-catalytic and breaks the polymeric bonds in the plastic feedstocks by thermal disruption. The extent of the thermal decomposition is related to the temperatures of the melt tank and the reactor. In general, the higher the temperature the greater the amount of thermal decomposition of the feedstock plastic and the lower the molecular weight of the products (i.e., the polymer chains are broken up into smaller segments with fewer carbon atoms). The process temperature used therefore is a balancing act between being too high (resulting in a higher gas make and lighter low-viscosity liquid products) and being too low (resulting in a lower gas yield and heavier high-viscosity liquid products).

Changes in the composition of the feedstock plastic will affect the preferred temperature for melting and pyrolyzing the waste plastic materials. In particular, increased amounts of PVC and high density PP and PE in the feedstock will require the temperature to be increased. Similarly, increased amounts of low density PP and PE along with reduced quantities of PVC in the feedstock will enable a lower process temperature to be used.

Following melting and pyrolysis, embodiments herein may then use fractionation to separate the gas and liquids into the desired product streams. Embodiments herein may provide the following product slate: (i) combustible pyrolysis gas; (ii) a lighter liquid product with physical and chemical properties similar to untreated wild naphtha or gasoline; (iii) heavier liquid products with physical and chemical properties similar to untreated diesel and heavy oil; and (iv) a heavy liquid pitch product that can be blended with asphaltenes from other refinery processes.

One advantage of embodiments herein is its simplicity and flexibility to handle variations in the plastic feedstock composition and capacity. Further, as embodiments of processes herein do not require the addition of any catalysts or additives, the process requires fairly simple primary process controls (i.e., temperature) to govern the product yields and properties. In particular, embodiments herein are directed toward controlling the temperature throughout the melting and pyrolysis stages to preferentially produce pyrolysis liquids while resulting in formation of little or no char or coke.

Processes for melting and pyrolyzing waste plastics according to embodiments herein may be performed in batch, semi-batch, or continuous operations. Multiple types of reactor designs can be used to accommodate processes disclosed herein. Further, the processes herein may be performed in one or more vessels or reactors, such as a single vessel for all melting and reaction stages, or in multiple vessels, such as a first vessel for melting the waste plastic and a second vessel for pyrolyzing the polymer melt.

In particular, processes according to embodiments herein may progressively phase plastic feed material through a sequence of defined heating rates for discrete durations to achieve target temperatures and conversions. In one or more heating stages, a waste plastic material may be heated from an initial temperature to a peak pyrolysis temperature. After reaching the peak pyrolysis temperature, in a final pyrolysis stage, a heat input may be provided and which may be sufficient to maintain a temperature of the waste plastic at a pyrolysis reaction temperature less than the peak pyrolysis temperature. The waste plastic at the pyrolysis reaction temperature may be maintained for a time period to convert the waste plastic to a pyrolyzed product and a pitch.

As noted above, it is presently common practice to bring a polymer up to a single set point temperature for pyrolysis or to continue heating up to temperatures that form a significant amount of char. In contrast to these processes, it has been found that by controlling the heating rate of the feed, rather than just trying to achieve a target temperature or steady heat input, greater control of the overall reaction rate and yield is achieved. By adding heat quickly when possible and slowly when necessary, the overall duration of the process may be optimized. This may result in more economical reactor design for large capacity continuous plants. Further, by reaching a peak temperature early in the conversion process, such as when less than 30 wt % or less than 40 wt % or less than 50 wt % or less than 60 wt % conversion is attained, significantly more hydrogen is available for the pyrolysis reaction to proceed at the lower than peak pyrolysis temperature, resulting in a very low amount of coke or char formation.

Embodiments herein may target a rapid heating of the molten feed up to a temperature where the pyrolysis reaction is not likely to occur, or occurs at a very slow rate. This may nullify, or reduce, the chances of high gas make while reducing the heating surface demand. This is followed by a reduced heating rate to a high temperature. This step enables sensible heat transfer in homogeneous fashion to the entire plastic feed. The high temperature helps maximize the reaction rate at an early stage of conversion process. A short residence time in this step achieves the desired conversion. After peaking at a maximum temperature, where the plastic has more sensible heat than it needs to further the reaction, excess heat of one step is carried over to the next to provide energy. This energy carryover reduces the external energy demand that is needed to pass through the heat transfer boundary at a moment when the reaction temperature is highest and most heat is needed. Thus, the subsequent steps operate at a colder temperature to produce maximum liquid and pitch instead of char or solid coke. Additionally, the colder temperature suppresses the poly aromatics formation reaction that contributes towards coke make. In some embodiments, less than 2 wt % of the feed waste plastic may be converted to coke; less than 1 wt % in other embodiments; less than 0.5 wt % in yet other embodiments, and less than 0.1 wt % in yet other embodiments. Depending upon the final reaction temperature hold time, conversions of greater than 90 wt % based on the weight of feed plastic may be achieved, such as greater than 94 wt %, greater than 95 wt %, or greater than 96 wt %, while pitch may be produced in a range of 3 wt % to 10 wt %. In various embodiments, the product mixture produced according to embodiments herein may provide for conversion of the waste plastics into pyrolysis liquids (65 wt %-75 wt %), pyrolysis gas (20 wt %-30 wt %) and pitch (2-8 wt %). Little or no conversion of the waste plastics to coke occurs.

One or more embodiments herein may be directed toward a continuous or batch process by which a molten stream of plastic feed is stepped through a pyrolysis reaction in a series of discreet steps, stages, or zones as follows. Regardless of the type of process or the number of steps, stages, or zones, the process recipe of achieving a peak temperature and then continuing pyrolysis at a less than peak temperature has been found to provide a preferential product mixture as described above.

In Step 1, a continuous molten feed or batch load is introduced to the process at a temperature between 250° C. and 415° C., or between 275° C. and 410° C., such as between 300° C. to 400° C. Gas and vapor produced that does not re-condense leaves the system and the remaining feed/batch progresses to the next step.

In Step 2, thermal energy is added to the feed/batch at a rate of between 30° C./min to 200° C./min, such as at a rate between 50° C./min and 175° C./min. Target temperature for this step is 380° C. to 450° C., such as 400° C. to 430° C. Vapor that is produced and does not re-condense exits the system and the remaining feed/batch progresses to the next step. A maximum heating rate is targeted in this step.

In Step 3, thermal energy in the form of heat is added to the feed/batch at a rate of 15° C./min to 30° C./min, such as about 20° C./min to 25° C./min. Target temperature for this step is 450° C. to 550° C., such as a temperature between 470° C. and 500° C. Vapor that is produced and does not re-condense exits the system and the remaining feed/batch progresses to the next step. A maximum rate of reaction is achieved and targeted in this step of the reaction.

In Step 4, in order to slow down the rate of reaction, which helps maximizing liquid product, this step is used to cool down the remaining feed to a temperature of 425° C. to 485° C., such as from 435° C. to 475° C., by using the endothermic reaction of feed. In some embodiments, this step is used to cool down the remaining feed to a temperature of 435° C. to 465° C. or 445° C. to 465° C. A sufficient amount of heat is added to the feed/batch to balance net heat added and heat consumed by the endothermic reaction to reach and maintain the desired temperature. This results in an overall heating rate of −20° C./min to −200° C./min (negative sign indicates cooling down). Gas and vapor that is produced and does not re-condense exits the system and the remaining feed/batch progresses to the next step. Steps 1-4, combined, may total a duration of 2-60 minutes, such as 2-20 minutes in some embodiments.

In Step 5, thermal energy is added to maintain a lower reaction temperature, in the range of 425° C. to 475° C., such as from 435° C. to 465° C. The lower reaction temperature in this step is used in order to minimize coking, further boost the liquid yield, and minimize aromatics in the heavy liquid. An overall conversion of feed up to 90 wt %, up to 95 wt %, or up to 97 wt %, is achieved in this step, resulting in a remaining pitch material in liquid form. The residence time in this step is maintained between 15 min to 60 min, or that which is needed to attain the desired conversion. Pitch is withdrawn from the reaction system as a liquid. Pyrolysis products are withdrawn as a vapor.

The above steps outline the processes as may be performed in a batch or continuous pyrolysis reactor according to embodiments herein with an already molten plastic, for example. Embodiments herein may be performed in a single vessel, including a melting stage prior to the above-mentioned reaction stage having the described or similar steps. Other embodiments herein may be performed in multiple vessels, including a melting zone/melting stage for providing the molten polymer, and a pyrolysis zone/reaction stage for converting the molten plastics to pyrolysis oil.

A melting zone may be used to heat the plastic waste up to a temperature high enough to where the polymer is molten, but low enough such that and the pyrolysis reaction is not likely to occur (less than 2 wt % conversion per hour of residence time at the melt temperature, such as less than 1 wt % conversion per hour). The molten plastic may then be transferred to a pyrolysis zone, where the melt may be initially heated to a peak temperature, followed by continued reaction at a pyrolysis temperature less than the peak temperature.

A simplified process flow diagram of a thermochemical process according to embodiments herein is illustrated in FIG. 1. A plastic waste feed 10 may be fed to a pyrolysis reaction area 20 for conversion of the plastics to a pyrolysis oil, which may include various hydrocarbons, such as light (C1 to C4) hydrocarbons, naphtha range hydrocarbons, diesel range hydrocarbons, and heavier hydrocarbons, possibly up to pitch. The pitch may be recovered as a byproduct stream 12, and the remaining conversion products (pyrolysis oil and pyrolysis gas) may be recovered via one or more flow lines 14. The pyrolysis oil/gas in flow line 14 may then be fed to a distillation and separation area 22 for separating the pyrolysis oil into various hydrocarbon fractions, such as the aforementioned light hydrocarbons 15, naphtha 16, diesel 18, and heavy oil fractions 19. In various embodiments, gas produced in the pyrolysis process can be utilized as an energy source for the process itself, such as by recycling a portion of the light hydrocarbons 15 to a furnace or heating device in the pyrolysis reaction area 20, or may be captured and separated to be sold as a product.

Heat input to the one or more vessels used for melting and pyrolyzing the polymer feed can be via burners and flue gas channels in an exterior jacket of a vessel. Alternatively, electrical heating elements may be used, or a heating fluid may be used to supply heat to one or more external jackets or internal coils. Overall, embodiment herein are not limited to any one heating method, although some methods may provide greater control of the heating rates than others. A control system may be provided, and the control system may be configured to manipulate valves and other system components to control a heat input into each heating zone to provide the heating rates and temperatures as described further below.

In embodiments herein using separate melting and reaction sections, the reaction may be carried out at relatively low pyrolysis temperatures with much smaller residence time (total of 15 to 90 minutes, such as 17.5 to 75 minutes) compared to typical plastic pyrolysis processes. Coking is minimized by operating the longest residence time zone at a maximum temperature of 455° C.-475° C., for example, and by removing a pitch product instead of allowing char to form.

Overall, the melting and reaction stage may be outlined as follows. In a melting stage, the waste plastic material may be heated from an initial temperature to a melt temperature. The melt temperature may be less than a pyrolysis reaction temperature. In some embodiments, the melting step may be performed in multiple steps, such as a first step of heating a waste plastic from an initial temperature ($T_0$) to a first temperature ($T_1$) and maintaining the waste plastic at the first temperature for a first time period, producing a first heated plastic, and a second step of heating the first heated plastic to a second temperature ($T_2$) and maintaining the first heated plastic at the second temperature for a second time period, producing a second heated plastic. The first heating step may be provided, for example, to remove any moisture that may be present with the waste plastic feed, which may be in the form of shredded plastic, pellets, small fibers, chips, or chunks, as may be received from a recycler or from an upstream processing of bulk polymeric waste, such as a chipping or shredding system. Moisture removal may occur, for example, using hot nitrogen, which may heat the polymer waste up to a temperature of greater than 100° C. but less than a melting temperature of the polymer. Following moisture removal, the polymer may be heated up to a temperature sufficient to melt the polymer, such as a temperature in the range from 200° C. to 400° C., noting the melt temperature used may be dependent upon the polymer waste mixture being processed. The temperature of the melt is, as noted above, maintained in this step at a temperature lower than that required to initiate the pyrolysis reaction. The polymer melt may then be maintained at this temperature, in a molten state prior to pyrolysis or for transport to the pyrolysis reaction zone.

In some embodiments, the initial temperature ($T_0$) may be an atmospheric temperature. For example, the waste plastic may be stored at a temperature in the range from about −10° C. to 40° C., such as from 0° C. to 35° C. The first temperature ($T_1$) may be in a range from about 80° C. to about 200° C., such as from about 90° C. to about 150° C. The second temperature ($T_2$) may be in a range from about 200° C. to about 400° C., such as from about 225° C. to about 375° C., or from about 250° C. to about 350° C.

In the reaction stage, pyrolysis may be conducted by heating the molten polymer from the second temperature to a peak pyrolysis temperature. Heating to the peak pyrolysis temperature may also be conducted in multiple steps. For example, a first pyrolysis step may be used to heat the second heated (molten) plastic to a third temperature ($T_3$) and maintaining the second heated plastic at the third temperature for a third time period, producing a third heated plastic. A second pyrolysis step may include heating the third heated plastic to a fourth, peak, temperature ($T_4$), producing a fourth heated plastic. Pyrolysis may then continue at a fifth temperature ($T_5$), lower than the fourth temperature, by providing a heat input sufficient to maintain a temperature of the fourth heated plastic at the fifth temperature and maintaining the fourth heated plastic at the fifth temperature for a fourth time period, allowing the pyrolysis reaction to proceed until a desired conversion of waste plastic is achieved.

The third temperature ($T_3$) may be in a range from about 275° C. to about 475° C., such as from about 285° C. to about 465° C., or from about 300° C. to about 450° C. The fourth temperature ($T_4$) may be in a range from about 400° C. to about 600° C., such as from about 425° C. to about 575° C., or from about 450° C. to about 550° C. The fifth temperature ($T_5$) may be in a range from about 400° C. to about 525° C., such as from about 400° C. to about 500° C., or from about 425° C. to about 475° C.

As outlined above, where multiple heating steps are used for melting and pyrolysis, T1 is less than T2, T2 is less than T3, T3 is less than T4, and T5 is less than T4, the peak pyrolysis temperature. Each heating step may include a temperature stabilization (hold) time prior to the next heating step. Such a process recipe may achieve product targets, such as ratios of liquid/gas products, the quality of the liquid fractions produced, as well as minimizing residual coke.

In various embodiments, the first time period, second time period, and fourth time period are each longer in duration than the third time period. A ratio of the third time period to the second time period is in a range from 1:5 to 1:50 in some embodiments, such as from 1:10 to 1:30 in other embodiments. A ratio of the fourth time period to the third time period may be in the range from 2:1 to 15:1 in some embodiments, such as from 3:1 to 12:1 in other embodiments.

In some embodiments, the heating or pyrolysis reaction may be conducted as a continuous process in a downflow reactor, introducing low temperature polymer or polymer melt at a top of the vessel or reactor and withdrawing a polymer melt or pitch at a bottom of the vessel or reactor. In such downflow systems, the thermal energy of vapor produced in a section or zone of the vessel may be utilized to provide heat to an upstream section or zone of the vessel. A part of vapor can condense after heat exchange and can return back in the reaction system, promoting secondary reactions by increasing effective residence time. These secondary reactions may promote generation of more liquid product.

In some embodiments, a rate of heating, in ° C./min, from the initial temperature to the first temperature is in a range from about 10° C./min to 30° C./min. The initial heating rate may be similar to, equal to, greater than, or less than a rate of heating from the first temperature to the second temperature. In some embodiments, initial heating rate may be similar to, or equal to, a rate of heating from the first temperature to the second temperature. For example, a rate of heating from the first to second temperatures may be in a range of 5° C./min to 40° C./min, from 10° C./min to 30° C./min, or from 20° C./min to 25° C./min. Similarly, a rate of heating from the first temperature to the second temperature may be similar to, equal to, greater than, or less than to a rate of heating from the second temperature to the third temperature. In some embodiments, a rate of heating from the first temperature to the second temperature may be similar to, or equal to a rate of heating from the second temperature to the third temperature.

In some embodiments, a rate of heating, in ° C./min, from the second temperature to the third temperature is less than a rate of heating from the third temperature to the fourth temperature. For example, a rate of heating from the second to the third temperature may be in a range of 5° C./min to 40° C./min, from 10° C./min to 30° C./min, or from 20° C./min to 25° C./min. For example, a rate of heating from the third to fourth temperatures may be in a range of 15° C./min to 250° C./min, such as from 20° C./min to 200° C./min. In some embodiments, a rate of heating from the third to the fourth temperatures may be performed in stages, such as in two heating sections, heating the third heated plastic at a rate of heating of greater than 50° C./min to an intermediate temperature, and then heating the third heated plastic from the intermediate temperature to the peak temperature at a rate of heating in the range of 10° C./min to 40° C./min, such as from 15° C./min to 30° C./min. Heating the third heated plastic at a rate of heating of greater than 50° C./min to an intermediate temperature may include heating the third heated plastic at a rate in a range from 75° C./min to 225° C./min, such as between 100° C./min to 200° C./min.

Example 1

Figure 2:
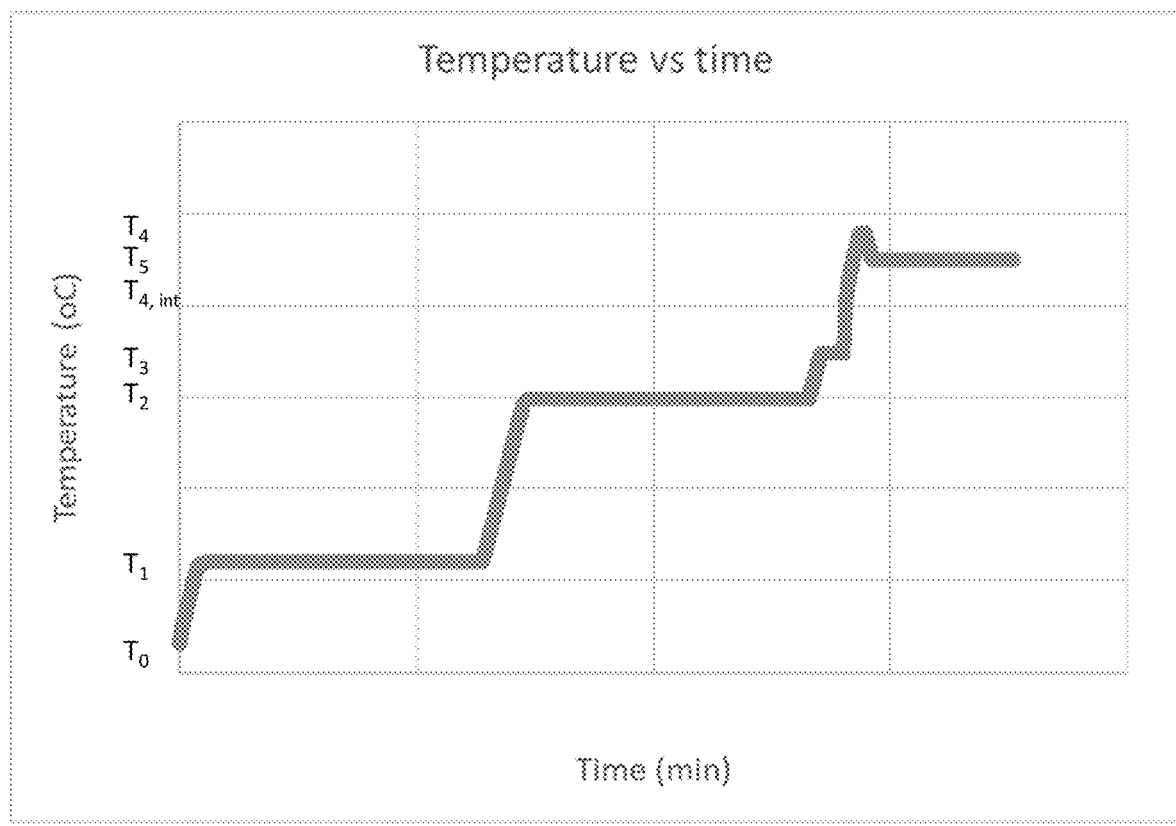
FIG. 2 illustrates a reaction temperature-residence time profile for pyrolyzing waste plastics according to one or more embodiments disclosed herein.

A waste plastic was heated stagewise, as illustrated in FIG. 2. A constant heating rate was provided to raise the temperature from an initial temperature ($T_0$) to a first temperature ($T_1$). The temperature was held at $T_1$ for a period of time, allowing for removal of moisture and homogenization of the temperature of the waste plastic. Following removal of the moisture, a constant heating rate was again applied to raise the temperature from $T_1$ to a second, melt, temperature ($T_2$). The polymer melt was held at $T_2$ and allowed to stabilize at that temperature, resulting in a melt having a relatively homogeneous temperature.

After achieving a homogeneous melt temperature and holding at $T_2$ for a time period, the polymer melt was heated using a constant heating rate to a third temperature $T_3$. $T_3$ was targeted as a temperature slightly below that which would result in pyrolysis of the plastic, or would pyrolyze at a very slow reaction rate (<5% conversion after holding at $T_3$ for a short period of time). The polymer melt was then rapidly heated (>50° C./min) to an intermediate temperature ($T_{4,int}$) and then the heating rate decreased (about 20° C./min) to heat the polymer melt to a peak pyrolysis temperature ($T_4$). After achieving the peak temperature, the polymer melt was then allowed to cool to a lower pyrolysis temperature ($T_5$) and held at $T_5$ for a time period to pyrolyze the waste plastic. The peak temperature $T_4$ was achieved with less than 50 wt % conversion, and following reaction at $T_5$, approximately 95 wt % conversion was achieved. The resulting product mixture included 70 wt % pyrolysis liquids, 25 wt % pyrolysis gas, and about 5 wt % pitch. Essentially no coke or char was formed.

As described above, embodiments herein may heat a polymer to a peak pyrolysis temperature, and subsequently maintain the pyrolysis reaction at a lower-than-peak temperature. It has been found that there is a benefit to peaking the temperature at lower conversions, rather than at the end of the reactor or reaction cycle, producing more and better quality pyrolysis oil while minimizing coke formation. This is a result of the presence of more hydrogen in the overall mixture at the peak temperature. Further, the "peak then cool" scheme takes advantage of the endothermic reaction. Comparatively, peak then cool has also been found to be beneficial over simply maintaining a lower reaction temperature, as the use of a higher peak temperature than the soak temperature improves the reaction and performance of the reactor.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed as new and desired to be protected by Letters Patent is:

1. A process for pyrolyzing waste plastics, the process comprising:
   heating a waste plastic from an initial temperature to a first temperature in a reaction system and maintaining the waste plastic at the first temperature for a first time period, producing a first heated plastic;
   heating the first heated plastic to a second temperature in the reaction system and maintaining the first heated plastic at the second temperature for a second time period, producing a second heated plastic;
   pyrolyzing the second heated plastic by heating the second heated plastic to a third temperature in the reaction system and maintaining the second heated plastic at the third temperature for a third time period, producing a third heated plastic;
   pyrolyzing the third heated plastic by heating the third heated plastic to a fourth, peak, temperature in the reaction system, producing a fourth heated plastic; and
   pyrolyzing the fourth heated plastic by providing heat input sufficient to maintain a temperature of the fourth heated plastic at a fifth temperature in the reaction system and maintaining the fourth heated plastic at the fifth temperature for a fourth time period;

recovering a pyrolyzed product from each of the pyrolyzing steps as a vapor and recovering a pitch as a liquid from the reaction system;

wherein the first temperature is less than the second temperature, the second temperature is less than the third temperature, the third temperature is less than the fourth, peak, temperature, and the fifth temperature is less than the fourth, peak, temperature; and wherein heating the third heated plastic to a fourth, peak, temperature comprises:

heating the third heated plastic at a rate of heating of greater than 50° C./min to an intermediate temperature; and heating the third heated plastic from the intermediate temperature to the fourth, peak, temperature at a rate of heating in a range of 15° C./min to 30° C./min.

2. The process of claim 1, wherein an overall conversion of the waste plastic to pyrolyzed product is in a range from about 90 wt % to 97 wt %.

3. The process of claim 1, wherein a conversion of the waste plastic to pitch is in a range from about 3 wt % to 10 wt %.

4. The process of claim 1, wherein less than 1 wt % of the waste plastic is converted to coke or char.

5. The process of claim 1, wherein a rate of heating, in ° C./min, from the second temperature to the third temperature is less than a rate of heating from the third temperature to the fourth, peak, temperature.

6. The process of claim 1, wherein a rate of heating, in ° C./min, from the initial temperature to the first temperature is equal to a rate of heating from the first temperature to the second temperature.

7. The process of claim 1, wherein a rate of heating, in ° C./min, from the first temperature to the second temperature is equal to a rate of heating from the second temperature to the third temperature.

8. The process of claim 1, wherein the first time period, second time period, and fourth time period are each longer in duration than the third time period.

9. The process of claim 8, wherein a ratio of the third time period to the second time period is in a range from 1:10 to 1:30.

10. The process of claim 8, wherein a ratio of the fourth time period to the third time period is in a range from 3:1 to 12:1.

11. The process of claim 1, wherein:
the initial temperature is in a range from 0° C. to 35° C.;
the first temperature is in a range from 90° C. to 150° C.;
the second temperature is in a range from 250° C. to 350° C.;
the third temperature is in a range from about 300° C. to 450° C.;
the fourth, peak, temperature is in a range from 450° C. to 550° C.; and
the fifth temperature is in a range from 400° C. to 500° C.

12. The process of claim 1, wherein heating the third heated plastic at a rate of heating of greater than 50° C./min to an intermediate temperature comprises heating the third heated plastic at a rate in a range from 100° C./min to 200° C./min.

13. A system for pyrolyzing waste plastics, the system comprising:
a reaction system having
a first heating zone configured for heating a waste plastic from an initial temperature to a first temperature and maintaining the waste plastic at the first temperature for a first time period, producing a first heated plastic;
a second heating zone configured for heating the first heated plastic to a second temperature and maintaining the first heated plastic at the second temperature for a second time period, producing a second heated plastic;
a third heating zone configured for heating the second heated plastic to a third temperature and maintaining the second heated plastic at the third temperature for a third time period, producing a third heated plastic;
a fourth heating zone configured for heating the third heated plastic to a fourth, peak, temperature, producing a fourth heated plastic; and
a fifth heating zone configured for providing heat input sufficient to maintain a temperature of the fourth heated plastic at a fifth temperature, less than the fourth, peak, temperature, and maintaining the fourth heated plastic at the fifth temperature for a fourth time period to recover a pyrolyzed product as a vapor and a pitch as a liquid from the reaction system,
wherein the third heating zone, the fourth heating zone and the fifth heating zone are configured to conduct the pyrolysis; and
wherein the fourth heating zone comprises two heating sections, including a first heating section configured to provide heat sufficient to heat the third heated plastic at a rate of 50° C./min to 200° C./min and a second heating section configured to provide heat sufficient to heat the third heated plastic at a rate of 15° C./min to 30° C./min.

14. The system of claim 13, further comprising a control system configured to control a heat input to each heating zone.

15. The system of claim 13, wherein the fifth temperature is in a range from 425° C. to 475° C.

* * * * *